United States Patent [19]

Kehr et al.

[11] Patent Number: 5,185,398
[45] Date of Patent: Feb. 9, 1993

[54] HOT MELT ADHESIVE AND COATING COMPOSITION

[75] Inventors: Helmut Kehr, Schermbeck; Adolf Kühnle, Marl; Matthias Schleinzer, Dorsten, all of

[73] Assignee: Huels Aktiengesellschaft, Marl, Fed. Rep. of Germany

[21] Appl. No.: 510,760

[22] Filed: Apr. 18, 1990

[30] Foreign Application Priority Data

Apr. 20, 1989 [DE] Fed. Rep. of Germany ....... 3912949

[51] Int. Cl.$^5$ .................... C08L 23/20; C08L 51/06; C08J 123/20
[52] U.S. Cl. ......................... 525/74; 525/71; 525/77; 525/78; 525/80; 525/73; 524/504
[58] Field of Search ................ 525/73, 78, 80, 74

[56] References Cited

U.S. PATENT DOCUMENTS

| 3,483,276 | 12/1969 | Mahlman ................ 525/74 |
| 3,868,433 | 2/1975 | Bartz et al. ............ 260/876 R |
| 3,886,227 | 5/1975 | Van Brederode et al. ...... 260/836 |
| 4,567,112 | 1/1986 | Bernhard ............... 428/461 |

FOREIGN PATENT DOCUMENTS 59-109544 6/1984 Japan ...................... 525/74

Primary Examiner—Carman J. Seccuro, Jr.
Attorney, Agent, or Firm—Millen, White, Zelano and Branigan

[57] ABSTRACT

An adhesive coating composition comprising an extensively amorphous poly-alpha-olefin and a functionalized graft copolymer of a predominately crystalline propylene polymer and an unsaturated carboxylic acid or derivative thereof.

10 Claims, No Drawings

HOT MELT ADHESIVE AND COATING COMPOSITION

BACKGROUND OF THE INVENTION

The invention relates to a hot melt adhesive and coating composition processable by hot melt techniques and containing as the basic material predominantly amorphous poly-alpha-olefins.

It is known that it is possible to obtain, with hot melt adhesive compositions based on the poly-alpha-olefins utilized according to this invention and produced in a controlled fashion, an improved adhesion to substrates of various types by admixing (amount added 10–40% by weight) of a resin that is normally devoid of double bonds or contains a low amount of double bonds, such as, for example, a hydrocarbon resin, a terpene resin, or a hydrogenated colophony resin. However, besides exhibiting the advantage of improving adhesion, resins also display several disadvantages. They lower viscosity, i.e., cohesion, of the poly-alpha-olefin. Moreover, the resins usually combined with amorphous poly-alpha-olefins function as plasticizers in general and thus impair the heat deflection temperature thereof. Frequently, resins also lead to extensive impairment of heat stability, color, and odor of the melt-fluid compositions. Last, but not least, however, a significant improvement in adhesion by resin addition cannot be attained at all on certain substrates, such as polyolefins.

Also, the fact that functionalized polyolefins exhibit improved adhesion to polar and metallic surfaces and enhanced anchoring effect to fillers, such as, for example, calcium carbonate, has been basically known. However, this involves either high-molecular molding compositions containing, in part, nylon, rubber, or polyethylene, which are producible or processable only by way of expensive extruder techniques or hot melt formulations based on polyethylene or, alternatively, filler-containing compositions or compositions with a higher filler content, wherein the functional group exclusively serves the purpose of improving the anchoring of the polyolefins to a filler.

Therefore, the object to be attained resides in developing an optionally entirely resin-free, readily processable hot melt adhesive composition, making it possible to fully exploit during its processing the advantages of hot melt technology such as, for example, the lower outlay for apparatus as compared to the extrusion technique, the higher flexibility during the processing of a melt composition, for example, when changing the hot melt adhesive formulation, as well as the processing versatility (e.g., application by spraying), whereas this composition does not exhibit the drawbacks of the resin-containing formulations. Actually, various efforts have been undertaken in the past for effecting radical grafting of unsaturated carboxylic acids or their derivatives onto the poly-alpha-olefins used in accordance with this invention, in order to arrive at products having the above-enumerated advantages. Such efforts foundered, inter alia, on account on the very poor grafting yield and, respectively, on account of the facts that monomer can remain in the product, that radical grafting simultaneously initiates degradation or crosslinking reactions (for example, in case of poly-alpha-olefins containing ethylene), as well as that color impairment is brought about by the grafting reaction (see, for example, Minoura et al., J. Appl. Polym. Sci. 13, 1625 (1969); EP-OS 0 317 358; EP-OS 0 202 921; and EP-OS 0 269 000).

SUMMARY OF THE INVENTION

The invention involves a readily meltable and processable hot melt adhesive and coating composition comprising:

(a) 90–99.9 parts by weight of an at least partially amorphous poly-alpha-olefin, (b) 0.1–10 parts by weight of an olefin-carboxylic acid/acid derivative polymer carrying functional groups, preferably a functionalized graft copolymer of at least one olefin and an unsaturated carboxylic acid or derivative, (c) optionally further ingredients, and (d) optionally customary additives.

It was highly surprising that a hot melt adhesive composition composed as characterized in the claims and as explained in the following description fulfills all of the posed requirements, it being especially astonishing that even by adding less than 1% by weight (based on the mixture of (a)+(b) of component (b) utilized according to this invention, which per se merely exhibits a degree of grafting of markedly below 10%, the adhesion of the hot melt adhesive composition to polyolefins, such as, for example polypropylene and to metals, such as, for example aluminum, can be quite decisively and abruptly improved. This is of interest especially because thereby, as contrasted to adding resin, the remaining properties of component (a) utilized according to this invention, such as for example, the softening point, the viscosity, the "open time", and the mechanical properties, are hardly altered at all. "Open time" refers to the time span from application of the adhesive to joining of the components to be glued together.)

The hot melt adhesive composition of this invention contains 90–99.9, preferably 93–99.9, but especially 96–99.9 parts by weight of a poly-alpha-olefin which, according to the claim, is partially or extensively amorphous. This means that the degree of crystallinity, determined by X-ray diffraction, amounts to not more than 25%.

Such products can be polymerized in a controlled fashion on classical Ziegler catalysts and/or their further developments Such a process has been described in German Patent No. 2,306,667. Other particularly suitable amorphous poly-alpha-olefins are the propene/butene-1/ethene terpolymers, propene/butene-1 copolymers, and butene-1 homopolymers, obtainable under the trade name of VESTOPLAST ®, for example, corresponding to German Patent No. 2,306,667 or U.S. Pat. No. 4,309,522. However also amorphous poly-alpha-olefins, as disclosed, for example, in EP-OS 0,226,112; EP-OS 0,143,978; and DOS 2,613,587, are suitable in accordance with the claim, as well as the butene-1 homopolymers, butene-1/ethene copolymers, or propene/butene-1/ethene terpolymers commercially available under the trade names DURAFLEX ® and TAFMER ®. Preferably, component (a) has a softening point of 70°–140° C., a density of <0.90 g/cm$^3$, and a tensile strength of about 0.5 to 10 N/mm$^2$. More preferably, component (a) has a needle penetration of 10–80 mm·10$^{-1}$, a melt viscosity (at 190° C.) of between 1000 and 60,000 mPa s, a shear modulus (at 23° C.) of <30 N/mm$^2$, and a percentage elongation at break of between about 50 to 1500%. Component (a) may, therefore, be (i) an atactic homopolymer of propene or butene-1, (ii) a copolymer of propene or butene-1 with each other and/or with ethene, or (iii) a copolymer according to (ii) with at least one α-olefin of 5-8 carbon atoms.

The polymers (b) carrying functional groups in accordance with the invention involve predominantly crystalline polyolefins modified by grafting, which can be pure homopolymers based on propene, or also copolymers, such as, for example, propene-ethene copolymers, propene-butene-1 copolymers, or butene-1-ethene copolymers. Likewise, a mixture can be used of polypropylene and the last-mentioned copolymers. These polymers carrying functional groups exhibit an adequately high melt index for permitting intermixing into component (a) in a conventional melting or mixing vessel, i.e., the polymer melt to a sufficient extent under conventional conditions so that ready mixing with (a) is possible.

This component (b) is utilized in accordance with the invention in an amount of 0.1-10, preferably 0.1-7, and especially 0.1-4 parts by weight.

Usable polymers are, for example, polypropylenes grafted with, e.g., acrylic acid, methacrylic acid, or fumaric acid. Among this class of compounds are, for instance, the commercially available POLYBOND ® types. Also suitable are polypropylenes grafted with maleic anhydride (MA). Corresponding polymers are sold, for example, under the trade name of HERCOPRIME ® or EXXELOR ®. Basically suitable as the unsaturated acid are also maleic acid and aconitic acid. Likewise, suited are derivatives of such unsaturated carboxylic acid, e.g., anhydrides, esters, amides, imides, and metallic salts; optionally, a derivatization (e.g., amidation, esterification, formation of a metallic salt) can be carried out following the grafting reaction.

In general, the aforedescribed graft polymers of polypropylene are produced by conventional graft polymerization of the unsaturated acid or the anhydrides in the presence of the grafting substrate and a radical-forming agent. The latter can be peroxides, azo compounds, or high-energy radiation. Typical synthesis examples are indicated in EP-OS 0,188,926; Belgian Patent No. 692,301; Japanese Patent No. 27,421/66; or U.S. Pat. No. 3,499,819. In order to achieve a sufficient effect, the degree of grafting should be, e.g., >0.05%, preferably being 0.1-10%, particularly between 0.2 and 8%. Processing viscosities acceptable for practical conditions are obtained if the melt index (MFI 190/5) of the graft polymer is >30 g/10 min., preferably >40 g/10 min., and especially >60 g/10 min.

The compositions according to this invention are produced by mixing at an elevated temperature, suitably under a protective gas, such as nitrogen. Suitable devices for this purpose are melting vessels equipped with an agitator or heated kneaders. At temperatures of about 150°-200° C., preferably 170°-180° C., mixing is generally completed by up to 30 minutes.

Although the hot melt adhesive and coating composition of this invention is basically free of resin and wax, the addition of a further ingredient (c) can be advantageous in some cases.

Suitable as component (c) are small amounts of a resin or a wax, for example, to improve wettability and/or for regulating the viscosity or to control the "open time". Suitable and adequate are 1-30, particularly 1-20 parts by weight, based on 100 parts of (a) plus (b) plus (c). In case of the waxes, it is possible herein to use microcrystalline waxes, as well as synthetic waxes according to the Fischer-Tropsch process or in accordance with the Ziegler method, whereas the resins employed are primarily modified hydrocarbon terpene resins, polyterpene resins, aliphatic hydrocarbon resins, cyclic hydrocarbon resins, and hydrogenated colophony esters.

Also, the use of oils, polyisobutylene, and certain elastomers as component (c) is basically possible, for example, in case the viscosity of component (a) is to be altered (e.g., increased) or if, in individual cases, an improvement in low-temperature resistance is desired. Adhesion can also be positively affected by the addition of an elastomer. Preferred types of elastomers are thermoplastic rubbers like SEBS and SIS wherein the amount added can optionally range between 0 and 30 parts by weight, preferably between 0 and 20, especially however between 0 and 10 parts by weight, in each case based on 100 parts of (a) plus (b) plus (c). In case of types of elastomers that lend themselves less readily to mixing, such as, for example, SBS (thermoplastic rubber) or ethylenepropylene elastomers (statistic and sequential types), the use of a so-called "compatibilizer", e.g., resin or oil, is advantageous.

It is also possible, by means of a component (c) in the form of a readily flowing isotactic polypropylene (homo- or copolymer) to correct, if necessary, the softening point of the hot melt adhesive or coating composition of this invention in the upward direction. However, the amount added should not exceed 5 parts by weight, based on 100 parts of (a)+(b)+(c).

Finally, it is also possible to derivatize the composition of this ingredient by suitable selection of the further ingredient (c). Thereby, the viscosity curve in dependence on the temperature and the wetting characteristic on the substrate can be influenced. In some cases, it is also possible to control and/or additionally improve in this way the adhesion to specific substrates. Suitable derivatizing agents are, for example, metal hydroxides derived from sodium, potassium, calcium, and zinc; metal oxides derived from these metals; and metal carbonates derived from these metals, as well as mono- and polyhydric alcohols and amines having boiling points of above 120° C., preferably above 150° C., but especially above 180° C. Derivatizing is accomplished by mixing components (a) and (b) in a masticator or in a melting vessel provided with an agitator under a nitrogen atmosphere at an elevated temperature suitably at about 180° C. for 30 minutes. Addition of the derivatizing agent takes place (in dependence on the boiling point of the latter and on tee melting temperature of the mixture) at a temperature of between 120° and 180° C. After another 60 minutes of mixing time under a nitrogen atmosphere at a bulk temperature of between 120° and 180° C. (depending on the volatility of the derivatizing agent and on the melting temperature of the mixture), the reaction is finished.

Such modification of the properties of the compositions of the invention is wholly conventional and selection of suitable agents to be added may be routinely made by one of ordinary skill in the art based on a given desired property to be modified or imparted to the composition.

The hot melt adhesive or coating composition of this invention can, of course, be provided with further additives customary in the synthetic resin art, for example, thermal and light stabilizers, optical brighteners, antistatic agents, lubricants, and anti-blocking agents, nucleating agents, fillers and dyes, and pigments, as well as flame retardants.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the followed examples, all temperatures are set forth uncorrected in degrees Celsius and, unless otherwise indicated, all parts and percentages are by weight.

The entire disclosures of all applicants, patents, and publications, if any, cited above and below, and of corresponding West German Application No. P 39 12 949.7, filed Apr. 20, 1989, are hereby incorporated by reference.

EXAMPLES

1. Preparation of the Hot Melt Adhesive and Coating Composition

All of the mixtures according to Table 2 are produced in an oil-heated Meili laboratory kneader under a nitrogen atmosphere. The mixing time—unless derivatizing is performed—is generally 30 minutes; the internal temperature is 180° C.

Derivatizing (mixtures N and O) is conducted by first preparing a premix under the above-mentioned conditions from the amorphous poly-alpha-olefin (a) 2 and the functionalized polypropylene (b)13. Then the derivatizing agent (c) 15 or, respectively, (c) 16 is added. After another 60 minutes of mixing time under a nitrogen atmosphere and with an internal temperature of 180° C., the reaction is finished.

2. Preparation of Test Specimens (Laminates) and Conductance of Testing

The melt-fluid compositions of Table 2 are spread-coated by means of an Erichsen applicator on soda kraft paper, particular attention being paid to obtaining an extensively uniform coating weight (20-25 g/m$^2$). These test specimens are pressed in an ironing press against various substrates for a definite time period at defined temperatures (Table 3).

The strength of the adhesive bond is tested on test specimens of a format of 100 mm×25 mm; the respective test specimens are slightly peeled away in the longitudinal extension, and the peeled-away portion is stressed with a weight of 100 g ("peel test"). The time, in minutes, is determined needed to achieve a peeling-off effect. If no complete peeling occurs within a specific time, the test is terminated; the results obtained in this case can be recognized by the value of >600 min. (Table 4).

Evaluation

The state of the art is represented by compositions A, B, C, H, P, Q, R, T, and V consisting solely of component (a) or of the combination thereof, not claimed, with a polyolefin or a hydrocarbon wax or resin with ingredient (b) missing. These compositions attain, on polypropylene and aluminum foil, a peeling resistance of maximally 118 to 287 minutes.

Compositions D, E, F, G, I, K, L, M, N, O, S, U, and W are in accordance with the invention; these are made up of components (a) and (b). They yield a bond of such a strength that the peeling values range far above 600 minutes, and the peel test must be broken off. Quite clear is, for example, in a comparison of compositions D and E with composition A, the abrupt rise in the peeling values by even exceedingly small proportions of component (b); for this reason, such compositions are generally to be preferred. It can be seen from compositions N and O that the concomitant use of small amounts of further additives (c), which may be desirable for attaining additional effects, obvious does not impair the adhesive bond.

TABLE 1

| Ingredients Utilized | | |
|---|---:|---|
| (a) 1 Ethene/propene/butene-1 Terpolymer | | |
| Melt viscosity (at 190° C.) | 9,000 | mPa s |
| Softening point (ring and ball) | 106° | C. |
| Penetration | 20 | 0.1 mm |
| Density | 0.87 | g/cm$^3$ |
| Tensile strength | 1.3 | N/mm$^2$ |
| Shear modulus | 4 | N/mm$^2$ |
| Percentage elongation at break | 320% | |
| (a) 2 Ethene/propene/butene-1 Terpolymer | | |
| Melt viscosity (at 190° C.) | 5,300 | mPa s |
| Softening point (ring and ball) | 82° | C. |
| Penetration | 32 | 0.1 mm |
| Density | 0.87 | g/cm$^3$ |
| Tensile strength | 0.9 | N/mm$^2$ |
| Shear modulus | 1 | N/mm$^2$ |
| Percentage elongation at break | 430% | |
| (a) 3 Ethene/propene/butene-1 Terpolymer | | |
| Melt viscosity (at 190° C.) | 47,000 | mPa s |
| Softening point (ring and ball) | 107° | C. |
| Penetration | 26 | 0.1 mm |
| Density | 0.87 | g/cm$^3$ |
| Tensile strength | 1.3 | N/mm$^2$ |
| Shear modulus | 2 | N/mm$^2$ |
| Percentage elongation at break | 980% | |
| (a) 4 Propene/butene-1 Copolymer | | |
| Melt viscosity (at 190° C.) | 2,700 | mPa s |
| Softening point (ring and ball) | 129° | C. |
| Penetration | 14 | 0.1 mm |
| Density | 0.87 | g/cm$^3$ |
| Tensile strength | 1.9 | N/mm$^2$ |
| Shear modulus | 41 | N/mm$^2$ |
| Percentage elongation at break | 20% | |
| (a) 5 Butene-1 Homopolymer | | |
| Melt viscosity (at 190° C.) | 8,500 | mPa s |
| Softening point (ring and ball) | 122° | C. |
| Penetration | 5 | 0.1 mm |
| Density | 0.87 | g/cm$^3$ |
| Tensile strength | 6.0 | N/mm$^2$ |
| Shear modulus | 70 | N/mm$^2$ |
| Percentage elongation at break | 20% | |
| (c) 6 Isotactic Polypropylene | | |
| Viscosity number J | 160 | ml/g |
| Melt index (190/5) | 60 | g/10 min |
| (c) 7 Polypropylene Wax | | |
| Viscosity number J | 53 | ml/g |
| (c) 8 Synthetic Terpene Resin (ARKON ® P 90) | | |
| (c) 9 Aliphatic Hydrocarbon Resin (ESCOREZ ® 1102) | | |
| (b) 10 Polypropylene Grafted with Acrylic Acid | | |
| Melt index (190/5) | 64 | g/10 min |
| Acrylic acid content | about 6% | |
| (b) 11 Polypropylene (Homopolymer) Grafted with Maleic Anhydride | | |
| Maleic anhydride content | about 0.2% | |
| Melt index (190/5) | 133 | g/10 min |
| (b) 12 Polypropylene (Random Copolymer) Grafted with Maleic Anhydride | | |
| Maleic anhydride content | about 0.3% | |
| Melt index (190/5) | 139 | g/10 min |
| (b) 13 Polypropylene Grafted with Maleic Anhydride | | |

TABLE 1-continued

| Ingredients Utilized | |
|---|---|
| Maleic anhydride content | about 2% |
| Melt viscosity (at 190° C.) | 39,000 mPa s |
| Viscosity number J | 70 ml/g |
| (b) 14 Polypropylene Wax Grafted with Maleic Anhydride | |
| Molecular weight | about 4,500 |
| Acid number | 47 mg KOH/g |
| (c) 15 1,4-Butanediol | |
| (c) 16 Dodecylamine | |

TABLE 3

| Substrates | Temp. of Coated Soda Kraft Paper | Temp. of Substrate | Press Time |
|---|---|---|---|
| Soda kraft paper | 160° C. | 180° C. | 3 sec. |
| Polypropylene (Pressed Panel) | 160° C. | 180° C. | 5 sec. |
| Aluminum foil 50 μm | 170° C. | 180° C. | 5 sec. |

TABLE 2

Melt and Coating Compositions

| | A | B | C | D | E | F | G | H | I | K | L | M |
|---|---|---|---|---|---|---|---|---|---|---|---|---|
| a) 1 | 100 | 90 | 80 | | 99 | 95 | 95 | | | | | |
| a) 2 | | | | 99.5 | | | | 100 | 97 | 97 | 95 | 95 |
| a) 3 | | | | | | | | | | | | |
| a) 4 | | | | | | | | | | | | |
| a) 5 | | | | | | | | | | | | |
| c) 6 | | | | | | | | | | | | |
| c) 7 | | | | | | | | | | | | |
| c) 8 | | 10 | 20 | | | | | | | | | |
| c) 9 | | | | | | | | | | | | |
| b) 10 | | | | | | 5 | | | 3 | | | 5 |
| b) 11 | | | | | | | | 3 | | | | |
| b) 12 | | | | | | | | 3 | | | | |
| b) 13 | | | | 0.5 | 1 | 5 | | | | 5 | | |
| b) 14 | | | | | | | | | | | | |
| c) 15 | | | | | | | | | | | | |
| c) 16 | | | | | | | | | | | | |
| Melt Viscosity (mPa s at 190° C.) | 9 000 | 8 100 | 6 200 | 9 100 | 9 300 | 10 600 | 12 400 | 5 300 | 6 400 | 6 500 | 6 200 | 6 900 |

| | N | O | P | Q | R | S | T | U | V | W |
|---|---|---|---|---|---|---|---|---|---|---|
| a) 1 | | | | | | | | | | |
| a) 2 | 95 | 95 | 95 | 95 | | | | | | |
| a) 3 | | | | | 80 | 90 | | | | |
| a) 4 | | | | | | | | | 100 | 99 |
| a) 5 | | | | | | | 91 | 91 | | |
| c) 6 | | | 5 | | | | 9 | | | |
| c) 7 | | | | 5 | | | | | | |
| c) 8 | | | | | | | | | | |
| c) 9 | | | | | 20 | | | | | |
| b) 10 | | | | | | | | 9 | | |
| b) 11 | | | | | | | | | | |
| b) 12 | | | | | | | | | | |
| b) 13 | | 5 | 5 | | | | | | | 1 |
| b) 14 | | | | | | | 10 | | | |
| c) 15 | | 0.1 | | | | | | | | |
| c) 16 | | | 0.15 | | | | | | | |
| Melt Viscosity (mPa s at 190° C.) | 6 100 | 6 300 | 7 000 | 5 600 | 31 500 | 40 200 | 15 400 | 15 500 | 2 700 | 2 800 |

TABLE 4

Peeling Resistance in Minutes ("Peel Test")

| | A | B | C | D | E | F | G | H | I | K | L | M |
|---|---|---|---|---|---|---|---|---|---|---|---|---|
| Lamination with Soda Kraft Paper | 8 | 18 | 104 | n.d. | n.d. | >600 | 10 | 32 | n.d. | n.d. | >600 | 57 |
| Lamination with Polypropylene | 7 | 11 | 68 | >600 | >600 | >600 | >600 | 46 | >600 | >600 | >600 | >600 |
| Lamination with Aluminum Foil, 50 μm | 11 | 12 | 248 | >600 | >600 | >600 | >600 | 3 | >600 | >600 | >600 | >600 |

| | N | O | P | Q | R | S | T | U | V | W |
|---|---|---|---|---|---|---|---|---|---|---|
| Lamination with | n.d. | n.d. | 58 | 148 | n.d. | n.d. | 50 | n.d. | n.d. | n.d. |

TABLE 4-continued

| Peeling Resistance in Minutes ("Peel Test") | | | | | | | | | | |
|---|---|---|---|---|---|---|---|---|---|---|
| Soda Kraft Paper Lamination with Polypropylene | >600 | >600 | 87 | 29 | 118 | 235 | <1 | >600 | 7 | >600 |
| Lamination with Aluminum Foil, 50 μm | >600 | >600 | 22 | 24 | 287 | >600 | 5 | >600 | 9 | >600 | n.d. = not determined

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A hot-melt adhesive or coating composition comprising:
   (a) (96–99.9 parts by weight of an extensively amorphous poly-alpha-olefin having a degree of crystallinity, measured by X-ray diffraction of 25% or less, a softening point of 70°–140° C., a density of <0.90 g/cm$^3$l, and a tensile strength of between 0.5 and 10 N/mm$^2$, said poly-alpha-olefin being a propene/butene-1/ethene terpolymer, a propene/-butene-1 copolymer, a butene-1 homopolymer, or a butene-1-/ethene copolymer; and
   (b) 0.1–4 parts by weight of a functionalized graft copolymer of at least one predominantly crystalline propylene homopolymer or copolymer or mixture thereof and an unsaturated carboxylic acid or derivative thereof.

2. A composition according to claim 1, having a melt viscosity (measured at 190° C.) of between 1000 and 60,000 mPa s.

3. A composition according to claim 2, wherein component (b) is a copolymer of at least one predominantly crystalline propylene homopolymer or copolymer or mixtures thereof and an unsaturated carboxylic ester, amide, anhydride, imide, or metallic salt.

4. A composition according to claim 2, wherein component (a) has a needle penetration of 4–15 mm·10$^{-1}$, a melt viscosity (at 190° C.) of between 1000 and 20,000 mPa s, a shear modulus (at 23° C.) of between 30 and 80 N/mm$^2$, and a percentage elongation at break of between 10 and 50%.

5. A composition according to claim 2, wherein component (a) has a needle penetration of 10–80 mm·10$^{-1}$, a shear modulus (at 23° C.) of <30 N/mm$^2$, and a percentage elongation at break of between 50 and 1500%.

6. A composition according to claim 2, wherein component (a) is a copolymer which also includes at least one α-olefin of 5–8 carbon atoms.

7. A composition according to claim 2, wherein component (b) is obtained by graft polymerizing a predominantly crystalline propylene homopolymer or copolymer with maleic ac acid, aconitic acid, acrylic acid, methacrylic acid, or an anhydride amide, ester, imide, or metallic salt thereof.

8. A composition according to claim 2, wherein component (b) has a melt index (MFI 190/5) of >30 g/10 min.

9. A composition according to claim 2, further comprising a component (c) which is a wax, a resin, an oil, an elastomer, or a derivatizing agent.

10. A hot-melt adhesive or coating composition comprising:
   (a) 96–99.9 parts by weight of a primarily amorphous poly-alpha-olefin having a softening point of 70°–140° C., a density of <0.90 g/cm$^3$, and a tensile strength of between 0.5 and 10 N/mm$^2$, said poly-alpha-olefin being a propene/butene-1/ethene terpolymer, a propene/butene-1 copolymer, a butene-1 homopolymer, or a butene-1/ethene copolymer;
   (b) 0.1–4 parts by weight of a functionalized graft copolymer of at least one predominantly crystalline propylene homopolymer or copolymer or mixtures thereof and an unsaturated carboxylic acid or derivative thereof; and
   (c) with the proviso that the adhesive contains no elastomeric polymer.

* * * * *